United States Patent
Dufresne et al.

(10) Patent No.: US 7,582,587 B2
(45) Date of Patent: Sep. 1, 2009

(54) PASSIVATION OF SULPHUR HYDROCONVERSION CATALYST

(75) Inventors: Pierre Dufresne, Valence (FR); Franck Labruyere, Saint Georges les Bains (FR)

(73) Assignee: Eurecat S.A., La Voulte sur Rhone (FR)

( * ) Notice: Subject to any disclaimer, the term of this patent is extended or adjusted under 35 U.S.C. 154(b) by 434 days.

(21) Appl. No.: 10/526,499

(22) PCT Filed: Feb. 6, 2004

(86) PCT No.: PCT/FR2004/000272

§ 371 (c)(1),
(2), (4) Date: Oct. 5, 2005

(87) PCT Pub. No.: WO2004/071655

PCT Pub. Date: Aug. 26, 2004

(65) Prior Publication Data

US 2006/0154812 A1 Jul. 13, 2006

(30) Foreign Application Priority Data

Feb. 11, 2003 (FR) .................................. 03 01634

(51) Int. Cl.
*B01J 20/34* (2006.01)
*B01J 38/30* (2006.01)
*B01J 38/22* (2006.01)
*B01J 27/02* (2006.01)

(52) U.S. Cl. ............................ 502/216; 502/41; 502/45

(58) Field of Classification Search ................... 502/41, 502/45, 216
See application file for complete search history.

(56) References Cited

U.S. PATENT DOCUMENTS

| | | | | |
|---|---|---|---|---|
| 2,905,636 A | * | 9/1959 | Watkins et al. | .......... 208/216 R |
| 3,838,066 A | | 9/1974 | Lovell | |
| 5,094,991 A | * | 3/1992 | Lopez et al. | ................. 502/219 |
| 5,922,638 A | * | 7/1999 | Dufresne et al. | ............. 502/216 |
| 5,958,816 A | * | 9/1999 | Neuman et al. | ................ 502/38 |
| 6,059,956 A | | 5/2000 | Dufresne | |
| 6,093,309 A | | 7/2000 | Seamans et al. | |
| 6,100,216 A | * | 8/2000 | Dufresne et al. | ............. 502/219 |
| 7,407,909 B2 | * | 8/2008 | McCarthy et al. | ............. 502/74 |
| 2002/0000394 A1 | | 1/2002 | Eijsbouts | |
| 2006/0060500 A1 | * | 3/2006 | Guillaume et al. | .......... 208/108 |

FOREIGN PATENT DOCUMENTS

JP 08-173824 * 7/1996

OTHER PUBLICATIONS

Search Report for PCT/FR2004/000272.*

* cited by examiner

*Primary Examiner*—Patricia L Hailey
(74) *Attorney, Agent, or Firm*—Millen, White, Zelano & Branigan, P.C.

(57) ABSTRACT

The present invention concerns a process for ex situ oxidizing passivation of hydrocarbon hydroconversion catalysts, in particular for hydrotreatment in their sulphurized states, in which the sulphurized catalyst undergoes two treatments: contact with an oxidizing gas stream, and contact with an organic liquid (for example hydrocarbon) which partially fills its pores.

20 Claims, No Drawings

PASSIVATION OF SULPHUR HYDROCONVERSION CATALYST

The invention concerns a process for ex situ passivation of a hydrocarbon hydroconversion catalyst.

Hydrotreatment catalysts generally comprise an amorphous or crystalline oxide support such as an alumina, a silica, a silica alumina, or a zeolite, on which at least one element from groups VIII and VI of the periodic table or a combination of a plurality of elements from these same groups is deposited, for example solids designated $CoMo/Al_2O_3$, $NiMo/Al_2O_3$ or $NiW/Al_2O_3$. They have to be sulphurized in advance to endow them with catalytic performances for hydrocarbon hydroconversion reactions, and in particular hydrotreatment (such as hydrodesulphurization, hydrodenitrogenation, demetallization) and certain hydrogenation reactions. This sulphurization step carried out prior to the catalytic step can be carried out in two different manners.

Firstly, in situ sulphurization is characterized in that the catalyst in its oxide form is initially charged into the hydrocarbon conversion reactor for sulphurizing therein. The second, ex situ pre-sulphurization, as described in a variety of the Applicant's patents (U.S. Pat. Nos. 4,719,195), 5,397,756, EP-A-0 785 022) differs from the preceding manner in that sulphurization or pre-sulphurization of the catalyst is carried out in a particular unit that is distinct from the hydrocarbon conversion reactor and is in particular located far from the location in which the catalyst is in service.

Within the context of the last, ex situ, sulphurization method, the sulphide phases formed have very high reactivity as regards the ambient air, prohibiting their subsequent manipulation in a complementary treatment aimed at limiting their reactivity. This reactivity towards oxidizing atmospheres is described in a United Nations standard which defines two classes of behaviour, namely a behaviour that is termed pyrophoric and a behaviour that is termed self-heating.

The pyrophoric nature of a compound is characterized by spontaneous combustion when in contact with an oxidizing atmosphere. A self-heating nature is characterized by a large temperature increase resulting from rapid oxidation when the product is heated under certain conditions to a temperature of 140° C.

The sulphide phase obtained from such pre-sulphurization processes turns out to be self-heating; to overcome this defect and to passivate that phase, the prior art describes methods consisting of adsorbing a certain amount of oxygen onto that sulphide phase. Those methods have a certain effect, but are sometimes insufficient. They result in being in the presence of a phase that is less and less self-heating. With those prior art processes, it is certainly possible in certain cases to manipulate the sulphide phase in air. In contrast, charging the catalyst into the reactor in the presence of air can cause the catalyst to heat up due to the large mass present, resulting in a dangerous environment. Thus, it was not recommended (although certain users persist in doing it) to charge the catalyst into a reactor in air, but a nitrogen atmosphere was safer. With the process described here, charging a reactor with catalyst in its sulphide phase in air becomes possible and safe.

The present invention concerns an improved process for passivation by heat treatment, a process associating treatment in a gas stream containing a partial pressure of oxygen (oxidizing passivation) and a treatment by incorporating an organic liquid (generally a hydrocarbon), said process thus endowing said catalyst with non self-heating behaviour as defined by the UN standard.

Thus, the present invention concerns implementing a passivation process using two treatments subsequent to ex situ catalyst sulphurization.

More precisely, the invention concerns a process for ex situ oxidizing passivation of a hydrocarbon hydroconversion catalyst, in which said sulphurized catalyst undergoes at least two treatments: contact with at least one oxidizing gaseous stream, and contact with at least one organic liquid with an initial boiling point of more than 120° C., which at least partially fills the pores of the catalyst.

This passivation process can also be carried out on a catalytic charge disposed in a fixed bed in a tube reactor or on a catalytic charge in motion in a moving bed unit such as a rotary oven, a fluidized bed oven, a band oven, a gravity bed reactor oven or a rising bed device. To reduce the self-heating behaviour (as defined by the UN standard) of the presulphurized catalyst to allow its ready manipulation in air, in particular during charging into hydrotreatment units, the catalyst is treated at temperature in a dry or moist gas stream containing a partial pressure of oxygen of at most 21.3 kPa (i.e. air).

The invention will be described in more detail using an implementation.

In one implementation, in a first step the sulphurized catalyst is brought into contact with at least one oxidizing gas stream and in a second step, it is brought into contact with said organic liquid.

The first step is a treatment in the presence of a gas (or gas stream) containing oxygen (for example deriving from dry or moist air) which can advantageously be carried out at ambient temperature. The reaction of oxygen adsorption onto the catalyst causes an exothermic effect which is preferably controlled so that the temperature of the product remains below 50° C. One possibility is to control the partial pressures of oxygen admitted to the catalyst. Then, a preferred manner of carrying out the invention is to initially treat the catalyst with a gas at a partial pressure of less than 8 kPa of oxygen, and secondly with a gas at a partial pressure of more than 8 kPa of oxygen. This second stage preferably begins when the exothermic effect has all but disappeared (i.e. when the temperature of the solid no longer increases or only increases slightly) or, if the operator has means for limiting the temperature increase, the second stage can then be started earlier. It is also possible to carry out the oxidizing passivation process directly with one or more gas streams having a partial pressure of oxygen of more than 8 kPa. This can be air if a suitable heat removal means is provided. This is particularly the case when the catalytic charge is disposed in a moving bed, in particular a moving bed such as a rotary oven, a fluidized bed oven, a band oven, a gravity bed reactor oven or a rising bed device.

This first gas phase passivation step can also be carried out on a catalytic charge disposed in a fixed bed (such as a tube reactor).

The second step is a treatment for impregnating at least one organic liquid (hydrocarbon or organic compound) into the pores of the catalyst. The organic liquid (or cut) will have an initial boiling point of more than 120° C., preferably more than 180° C. and more preferably more than 240° C. That liquid can be a liquid hydrocarbon selected from the group formed by white spirit, kerosene, gas oil, vacuum distillates, lube oil, wax or paraffin. Different hydrocarbonated agents can be used, on condition that the agent is eliminated during the initial phases of use of the catalyst in the reactor, so that access by molecules of the feed to be treated to the active sites of the catalyst is not impeded at all. The compound is preferably organic, containing carbon and hydrogen, and optionally heteroatoms, such as oxygen, sulphur or nitrogen, for example an alcohol, aldehyde, ketone, ester, amine, amide, mercaptan, sulphide or sulphone. Particularly advantageous esters are vegetable or animal oils, and partially unsaturated fatty acid triglycerides.

This product can be applied at ambient temperature or, for example, to facilitate the application of products that are solid at ambient temperature or have high viscosities, it may be possible to heat that product to a temperature of more than 50° C., or even 80° C. This would, for example, be the case for paraffin type materials, petroleum wax or polyethylene wax.

In a further implementation, the order of the steps is reversed with respect to the preceding implementation, i.e, in a first step, said sulphurized catalyst is brought into contact with said organic liquid and in a second step is brought into contact with at least one oxidizing gas stream.

All dispositions of the preceding implementation are applicable.

In an advantageous industrial scale implementation, contact with said gas stream is carried out in one or more stages with one or more gas streams all having a partial pressure of oxygen of more than 8 kPa.

Highly advantageously, the stream or streams is/are air.

Thus, contact with the oxidizing gas stream (such as air) is preferably achieved in a single stage by contact of said stream at a high partial pressure of oxygen directly onto the sulphurized catalyst or on the impregnated sulphurized catalyst.

All other dispositions of the preceding implementations are applicable.

As the examples will show, the first step of the process can advantageously be carried out in two stages, the first with a partial pressure of oxygen that is preferably 8 kPa or less, and the second, which commences with the disappearance of the exothermic effect, with a partial pressure of oxygen that is higher than that of the first stage and at most 21.3 kPa.

EXAMPLE 1

Preparation of Reference Catalyst: Ex Situ Sulphurization Without Passivation

A hydrotreatment catalyst containing 18.9% by weight of molybdenum oxide and 4.2% by weight of cobalt oxide deposited on an alumina support with a high specific surface area (220 m²/g) was sulphurized at atmosphere pressure using a mixture with a composition of 60% by volume of hydrogen sulphide ($H_2S$) and 40% by volume of hydrogen ($H_2$). Sulphurization of the catalyst was achieved in two stages, the first being a phase with a controlled temperature increase (5° C./min), the second a 1.5 hour stage at a final sulphurization temperature of 300° C. After sulphurization, the catalyst was cooled in a stream of nitrogen to ambient temperature. A portion of the product was transferred into a nitrogen atmosphere to analyze the degree of sulphurization. The remainder was isolated in nitrogen and served for characterizing the self-heating behaviour and measuring the gas oil hydrodesulphurization activity.

The degree of sulphurization is shown in the table below. It is defined as the ratio between the experimental mole ratio S/(Co+Mo) and the theoretical mole ratio S/(Co+Mo), multiplied by 100. This, corresponding to the total transformation of molybdenum oxide $MoO_3$ and cobalt oxide $CoO$ into the sulphides $MoS_2$ and $Co_9S_8$ respectively, was: $[S/(Co+Mo)]_{theo}=1.67$.

| Reference | S/(Co + Mo) | Degree of sulphurization (%) | $O_2$ (wt %) | Quantity of hydrocarbon (g/100 $g_{catalyst}$) |
| --- | --- | --- | --- | --- |
| Catalyst S | 1.59 | 95 | 0 | 0 |

The self-heating test was that defined by the UN standard, which classifies dangerous goods in class 4.2. A modified test was also used to provide more information on the sensitivity of the characterized product.

UN standard test: a catalyst was placed in a calcined cube; a thermocouple was introduced into the centre of the cube to record the temperature rise of the catalyst in the centre of the cube. The cube and thermocouple ensemble were placed in an air ventilated oven, pre-heated to 140° C. The oven and catalyst cube temperatures were recorded for 24 hours. The catalyst was said to be self-heating if the temperature over the 24 hours of the test exceeded 200° C. It then belonged to dangerous goods class 4.2 or to solid group 3190.

The modified test followed the same operating procedure with the exception that the oven temperature varied around 140° C. in 10° C. steps, until the internal temperature of the catalyst cube no longer exceeded 200° C. At each temperature, a new catalyst is tested. The notion of critical self-heating temperature (SHCT) is defined by the minimum oven temperature prior to triggering self-heating behaviour of the catalyst being characterized.

Along with the self-heating test, the catalyst was charged in a nitrogen atmosphere into a reactor of a gas oil hydrodesulphurization test unit. The catalyst was lined up by progressively increasing the temperature from ambient temperature to 350° C., in the presence of a gas oil flow of 2 liters per liter of catalyst per hour, at a hydrogen pressure of 3 MPa and at a hydrogen flow rate, expressed as the ratio of hydrogen to oil, of 400 l/l. After stabilizing for 8 hours under these conditions, the temperature was reduced to 330° C. After stabilizing for 24 hours, the liquid effluents were harvested over 15 hours, the residual sulphur quantity being measured by X ray fluorescence and compared with the initial gas oil. The activity model used a mathematical expression adopting a reaction order of 1.5. The relative weight activity (RWA) is expressed as the ratio between the activity of the test catalyst and that of the same sulphurized oxide catalyst in in situ mode by adding DMDS (dimethyl disulphide) to the liquid feed.

EXAMPLE 2

COMPARATIVE EXAMPLE

Passivation of a Catalyst Sulphurized by Heat Treatment in a Dry Oxidizing Stream The same catalyst as that used in Example 1 was sulphurized (same conditions as in Example 1) and purged in nitrogen at ambient temperature, then passivated using the oxidizing passivation procedure at ambient temperature. (below 30° C.). That treatment was carried out in two stages. The first consisted of a treatment in a dry gas stream with a partial pressure of oxygen of 7.6 kPa. The catalyst was maintained at that partial pressure of oxygen until the exothermic effect linked to chemisorption of oxygen onto the sulphide phase had disappeared. The second stage was achieved by stopping the diluting gas supply (nitrogen) so that the partial pressure of oxygen was than of dry air (21.3 kPa). The catalyst was left in this stream of air until the exothermic effect linked to the interaction of oxygen with the sulphide phase had disappeared. After this passivation treatment, the catalyst was stored in a nitrogen atmosphere. A portion of the sample was then removed under nitrogen to analyze the degree of sulphurization and the quantity of oxygen fixed during the passivation treatment. The remainder was isolated in the same atmosphere to characterize its self-heating behaviour and to measure its gas oil hydrodesulphurization activity.

The degree of sulphurization and the quantity of oxygen chemisorbed during the passivation treatment are shown in the table below. The quantity of chemisorbed oxygen was determined by the difference between the experimental loss on ignition measured for the passivated catalyst (treatment in a muffle furnace in air at 500° C. for 4 hours) and the theoretical loss on ignition defined for an identical degree of sulphurization.

| Reference | S/(Co + Mo) | Degree of sulphurization (%) | $O_2$ (wt %) | Quantity of hydrocarbon (g/100 $g_{catalyst}$) |
|---|---|---|---|---|
| Catalyst SP2 | 1.59 | 95 | 1.6 | 0 |

The self-heating test and the activity test on this catalyst, SP2, employed the same test protocol as that described for Example 1.

EXAMPLE 3

COMPARATIVE EXAMPLE

Passivation of a Catalyst Sulphurized by Direct Oil Incorporation

The same catalyst as that used in Example 1 was sulphurized using the same conditions as described for Example 1. At the end of the sulphurization treatment, the catalyst was purged in nitrogen at ambient temperature and transferred in the same atmosphere into a rotary drum maintained under nitrogen. Oil was gradually introduced and impregnated into the catalyst which was placed in motion, so that incorporation of the oil into the pores of the catalyst was as homogeneous as possible. The quantity of oil employed was 10 g of oil per 100 g of sulphurized catalyst. The oil used (150 Neutral Solvent) was selected from the family of mineral base stock the principal characteristics of which were a viscosity at 40° C. of 16 centipoises and a density of 0.86 g/cm³.

The quantity of oil actually incorporated into the catalyst is defined by the variation in the loss on ignition (treatment in a muffle furnace in air at 500° C. for 4 hours) between that measured on the impregnated catalyst and the theoretical loss on ignition defined for the same degree of sulphurization.

Catalyst SP3 obtained was characterized using an analogous methodology to that of the preceding examples.

| Reference | S/(Co + Mo) | Degree of sulphurization (%) | $O_2$ (wt %) | Quantity of hydrocarbon (g/100 $g_{catalyst}$) |
|---|---|---|---|---|
| Catalyst SP3 | 1.59 | 95 | 0 | 9.9 |

EXAMPLE 4

COMPARATIVE EXAMPLE

Passivation of a Catalyst Sulphurized by Direct Oil Incorporation in Larger Quantities This example is analogous to Example 3 above, with the exception that the quantity of oil employed was increased from 10 to 20 g per 100 g of sulphurized catalyst.

Catalyst SP4 obtained was characterized using an analogous methodology to that of the preceding examples.

| Reference | S/(Co + Mo) | Degree of sulphurization (%) | $O_2$ (wt %) | Quantity of hydrocarbon (g/100 $g_{catalyst}$) |
|---|---|---|---|---|
| Catalyst SP4 | 1.61 | 96 | 0 | 19.8 |

EXAMPLE 5

Passivation of a Catalyst Sulphurized by Treatment in an Oxidizing Stream Followed by Oil Incorporation The same catalyst as that used in Example 1 was prepared using the operating procedure used in Example 2 (sulphurization followed by two-stage oxidizing passivation). The catalyst obtained was characterized to define its degree of sulphurization and the quantity of oxygen chemisorbed by the sulphide phase using the same methodology as that described for Example 2.

After these successive treatments of sulphurization and passivation, 100 grams of said catalyst were introduced into a rotary impregnator kept at ambient temperature and in air, to incorporate oil using the protocol used in Example 3. The nature and quality of the oil were identical to those used to prepare catalyst SP3, namely 10 g of 150 Neutral Solvent per 100 g of sulphurized and passivated catalyst.

The quantity of oil actually incorporated into the catalyst is defined by the variation in the loss on ignition (treatment in a muffle furnace in air at 500° C. for 4 hours) between that measured on the impregnated catalyst and that measured before impregnation.

The characteristics of catalyst SP5 obtained are shown in the table below.

| Reference | S/(Co + Mo) | Degree of sulphurization (%) | $O_2$ (wt %) | Quantity of hydrocarbon (g/100 $g_{catalyst}$) |
|---|---|---|---|---|
| Catalyst SP5 | 1.59 | 95 | 1.6 | 9.7 |

EXAMPLE 6

Passivation of a Catalyst Sulphurized by Treatment in an Oxidizing Stream Followed by Incorporation of a Vegetable Oil This example is analogous to Example 5 above (gas phase sulphurization, oxidizing passivation in a dry gas stream and oil incorporation) with the exception that the oil used was an oil of vegetable origin (refined rapeseed oil). The principal characteristics of this refined rapeseed oil were a density of 0.92 g/cm³ and an iodine number of 114. The quantity of vegetable oil employed during impregnation was kept at 10 g per 100 g of sulphurized passivated catalyst as described in Example 3.

This catalyst, SP6, was characterized using the same techniques as those used for the preceding examples.

| Reference | S/(Co + Mo) | Degree of sulphurization (%) | $O_2$ (wt %) | Quantity of hydrocarbon (g/100 $g_{catalyst}$) |
|---|---|---|---|---|
| Catalyst SP6 | 1.60 | 96 | 1.7 | 9.7 |

EXAMPLE 7

Passivation of a Catalyst Sulphurized by Treatment in a Moist Oxidizing Stream Followed by Incorporation of an Oil In this example, the sulphurized catalyst was passivated using the same oxidizing passivation protocol as that used in Example 2 (treatment in two steps in an oxidizing stream, partial pressure of oxygen of 7.6 kPa then 21.3 kPa at ambient temperature), with the exception that the oxidizing stream used had been saturated with water at a temperature of 25° C., prior to contact with the sulphide phase. This water saturation was obtained by bubbling the dry oxidizing stream in a saturator containing liquid water at ambient temperature. Under these conditions, the partial pressure of water was 3 kPa. At the end of these sulphurization and moist passivation treatments and prior to incorporating the oil, a loss of ignition measurement allowed the quantity of water adsorbed by the catalyst during the moist oxidizing passivation treatment to be determined and compared with that carried out on catalyst SP2. Following the sulphurization and moist oxidizing treatments, the catalyst was transferred to a rotary impregnator to undergo therein an oil incorporation step using the same operating procedure as that used in Example 5. the nature and quantity of oil were identical to those used in Example 5, namely 10 g of Natural Solvent per 100 g of sulphurized passivated catalyst.

The characteristics of this catalyst, SP7, are shown in the table below.

| Reference | S/(Co + Mo) | Degree of sulphurization (%) | $O_2$ (wt %) | $H_2O$ (wt %) | Quantity of hydrocarbon (g/100 $g_{catalyst}$) |
|---|---|---|---|---|---|
| Catalyst SP7 | 1.61 | 96 | 1.5 | 2.1 | 10.0 |

EXAMPLE 8

Passivation of a Catalyst Sulphurized by Treatment in an Oxidizing Stream Followed by Incorporation of a Larger Quantity of Oil This example is analogous to Example 5 above as regards the sulphurization, passivation and oil incorporation procedures, with the exception that the oil used in the last step was increased from 10 to 20 g of 150 Neutral Solvent oil per 100 g of sulphurized passivated catalyst.

This catalyst, SP8, was characterized using the same techniques as those already used for the preceding examples.

| Reference | S/(Co + Mo) | Degree of sulphurization (%) | $O_2$ (wt %) | Quantity of hydrocarbon (g/100 $g_{catalyst}$) |
|---|---|---|---|---|
| Catalyst SP8 | 1.61 | 96 | 1.5 | 19.5 |

EXAMPLE 9

Partial Passivation of a Catalyst Sulphurized by Treatment in an Oxidizing Stream Followed by Incorporation of Oil The same catalyst as that used in Example 1 was sulphurized using the same procedure described in Example 1. After this sulphurization step, the catalyst was purged in nitrogen at ambient temperature. At the end of this sulphurization treatment, the catalyst was passivated using an oxidizing passivation procedure which differed from that used in Example 2 in that it was carried out in a single step and at a single partial pressure of oxygen. This partial pressure was fixed at 7.6 kPa. After disappearance of the exothermic effect linked to chemisorption of oxygen onto the sulphide phases, the catalyst was transferred in nitrogen into a rotary impregnator kept in nitrogen to incorporate into it a quantity of mineral oil (150 Neutral Solvent) identical to that of Examples 5 and 7, namely 10 g of 150N per 100 g of sulphurized passivated catalyst.

Prior to the oil incorporation step, a sample of catalyst was removed to determine the quantity of oxygen chemisorbed by the catalyst.

The characteristics of this catalyst, SP9, are shown in the table below.

| Reference | S/(Co + Mo) | Degree of sulphurization (%) | $O_2$ (wt %) | Quantity of hydrocarbon (g/100 $g_{catalyst}$) |
|---|---|---|---|---|
| Catalyst SP9 | 1.62 | 97 | 0.5 | 9.8 |

EXAMPLE 10

Direct Incorporation of Oil into a Sulphurized Catalyst Followed by Passivation Treatment in an Oxidizing Stream This example was analogous to that of Example 3, in which after sulphurizing, the catalyst was impregnated directly with 10 g of 150 Neutral Solvent oil per 100 g of sulphurized catalyst. After these sulphurization and oil incorporation treatments, the catalyst underwent oxidizing passivation by treatment at ambient temperature (below 30° C.) using a procedure derived from that described in Example 2, and modified in that the catalyst was treated directly in undiluted dry air, thus at a partial pressure of oxygen of 21.3 kPa. In fact, the coating effect of the oil probably reduced the exothermic effect of oxygen adsorption. At the end of this treatment, the catalyst grains had a particularly advantageous dry appearance.

Prior to oxidizing passivation treatment, a sample of sulphurized impregnated catalyst was removed to precisely determine the quantity of oil actually impregnated. The remainder of the characterization was then carried out on the sulphurized, impregnated and passivated catalyst termed SP10. The results of these characterizations are shown below.

| Reference | S/(Co + Mo) | Degree of sulphurization (%) | Quantity of hydrocarbon (g/100 $g_{catalyst}$) | $O_2$ (wt %) |
|---|---|---|---|---|
| Catalyst SP10 | 1.59 | 95 | 10.1 | 1.3 |

EXAMPLE 11

Results of characterizations, and conclusion
Gas oil hydrodesulphurization activity (expressed as the relative weight activity) and the self-heating critical temperature (SHCT).

| Reference | Sulphurization treatment | Passivation treatment | | | RWA (%) | SHCT (° C.) |
|---|---|---|---|---|---|---|
| — | in situ | — | — | — | 100 | / |
| cat S | ex situ | — | — | — | 98 | <25 |
| catalyst SP2 | ex situ | $P_{O2}$ = 7.6 kPa | $P_{O2}$ = 21.3 kPa | — | 103 | 75 |
| catalyst SP3 | ex situ | imp'n 150 NS 9.9 g/100 g | — | — | 104 | 115 |
| catalyst SP4 | ex situ | imp'n 150 NS 19.8 g/100 g | — | — | 102 | 145 |
| catalyst SP5 | ex situ | $P_{O2}$ = 7.6 kPa | $P_{O2}$ = 21.3 kPa | imp'n 150 NS 9.7 g/100 g | 101 | 150 |
| catalyst SP6 | ex situ | $P_{O2}$ = 7.6 kPa | $P_{O2}$ = 21.3 kPa | imp'n rapeseed oil 9.7 g/100 g | 99 | 155 |
| catalyst SP7 | ex situ | $P_{O2}$ = 7.4 kPa + $P_{H2O}$ = 2.9 kPa | $P_{O2}$ = 20.7 kPa + $P_{H2O}$ = 2.9 kPa | imp'n 150 NS 10.0 g/100 g | 100 | 165 |
| catalyst SP8 | ex situ | $P_{O2}$ = 7.6 kPa | $P_{O2}$ = 21.3 kPa | imp'n 150 NS 19.5 g/100 g | 102 | 175 |
| catalyst SP9 | ex situ | $P_{O2}$ = 7.6 kPa | — | imp'n 150 NS 9.8 g/100 g | 98 | 125 |
| catalyst SP10 | ex situ | imp'n 150 NS 10.1 g/100 g | $P_{O2}$ = 21.3 kPa | | 102 | 150 |

In conclusion, it appears that a non passivated sulphurized catalyst cannot be manipulated in air. A single oxidizing passivation step at ambient temperature improved their self-heating behaviour to authorize certain manipulations of the product in air. However, the product remained sensitive and it would not be prudent to authorize air charging in large hydrotreatment units. The necessity for a subsequent treatment appears to be useful to sufficiently reduce this self-heating character. A value considered to be acceptable is from a SHCT of 100° C. Incorporating a quantity of hydrocarbon into the pores of the catalyst can improve this characteristic, in a simple and cheap manner, beyond that which is possible to achieve by simple oxidizing passivation. In contrast, pre-passivation in air has two substantial advantages compared with oil passivation: it can considerably simplify the moist passivation process, in that this operation can be carried out in a free air atmosphere unit, as the catalyst can be manipulated in air, which is not the case with a directly sulphurized catalyst which spontaneously heats up in air. Further, the performance in reducing the self-heating effect, manifested by the SHCT (self-heating critical temperature) was excellent while using a reasonable quantity of oil, oxidizing pre-treatment saving on the quantity of oil. Further, it is remarkable to note that this novel oxidizing passivation process followed by partially filling the pores of the catalyst with a mineral base stock does not in any way alter the catalytic performance of the sulphurized phases for hydrotreatment reactions.

The invention claimed is:

1. A process for ex situ oxidizing passivation of a sulfurized hydrocarbon hydroconversion catalyst, comprising a first step of contacting said sulfurized catalyst with at least one oxidizing gaseous stream, and a subsequent step of contacting the catalyst with at least one organic liquid with an initial boiling point of more than 120° C. which at least partially fills the pores of the catalyst.

2. A process according to claim 1, wherein contact with said gas stream is carried out in two stages, the first in a partial pressure of oxygen of less than 8 kPa, the second in a partial pressure of oxygen that is higher than that of the first stage and at most 21.3 kPa.

3. A process according to claim 2, wherein the second stage of the first step is carried out in air.

4. A process according to claim 2, wherein the organic liquid comprises an ester.

5. A process according to claim 1, wherein contact with said gas stream is carried out in one or more stages with one or more gas streams all having a partial pressure of oxygen of more than 8 kPa.

6. A process according to claim 5 wherein the stream or streams is/are air.

7. A process according to claim 5, wherein the organic liquid comprises an ester.

8. A process according to claim 7, wherein the catalyst comprises Co and Mo.

9. A process according to claim 8, wherein said ester comprises animal or vegetable oils or partially unsaturated fatty acid triglycerides.

10. A process according to claim 1, wherein the catalyst is treated while in motion.

11. A process according to claim 10, wherein the catalyst is in a moving bed.

12. A process according to claim 11, carried out in a rotary oven, a fluidized bed oven, a band oven, a gravity bed reactor oven or a rising bed device.

13. A process according to claim 1, wherein said organic liquid used in the second step comprises kerosene, gas oil, a vacuum distillate, a lube oil, a wax or a paraffin with an initial boiling point of more than 1800° C.

14. A process according to claim 1, wherein said organic liquid comprises a compound containing at least one heteroatom selected from the group consisting of oxygen, sulphur and nitrogen.

15. A process according to claim 14, wherein said organic liquid comprises an alcohol, an aldehyde, a ketone, an ester, an amine, an amide, a mercaptan, a sulphide or a sulphone.

16. A process according to claim 15, wherein the organic liquid is an ester.

17. A process according to claim 16, wherein said ester comprises animal or vegetable oils or partially unsaturated fatty acid triglycerides.

18. A process according to claim 1, wherein the catalyst comprises Co and Mo.

19. A process for ex situ oxidizing passivation of a sulfurized hydrocarbon hydroconversion catalyst, comprising a first step of contacting said sulfurized catalyst with at least one oxidizing gaseous stream, and a second step of contacting the catalyst with at least one organic liquid with an initial boiling point of more than 120° C. which at least partially fills the pores of the catalyst, said second step being conducted on the catalyst previously contacted with said at least one oxidizing gaseous stream and without any intervening chemical reaction between the first and second steps.

20. A process for ex situ oxidizing passivation of a sulfurized hydrocarbon hydroconversion catalyst, comprising a first step of contacting said sulfurized catalyst with at least one oxidizing gaseous stream, and an immediately subsequent step of contacting the catalyst with at least one organic liquid with an initial boiling point of more than 120° C. which at least partially fills the pores of the catalyst.

* * * * *

UNITED STATES PATENT AND TRADEMARK OFFICE
CERTIFICATE OF CORRECTION

PATENT NO. : 7,582,587 B2
APPLICATION NO. : 10/526499
DATED : September 1, 2009
INVENTOR(S) : Dufresne et al.

It is certified that error appears in the above-identified patent and that said Letters Patent is hereby corrected as shown below:

Column 11, line 18 reads "boiling point of more than 1800°C", should read
-- boiling point of more than 180°C. --.

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,582,587 B2 Page 1 of 1
APPLICATION NO. : 10/526499
DATED : September 1, 2009
INVENTOR(S) : Dufresne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Fourteenth Day of September, 2010

David J. Kappos
*Director of the United States Patent and Trademark Office*